US007415018B2

(12) United States Patent
Jones et al.

(10) Patent No.: US 7,415,018 B2
(45) Date of Patent: Aug. 19, 2008

(54) IP TIME TO LIVE (TTL) FIELD USED AS A COVERT CHANNEL

(75) Inventors: Emanuele Jones, Ottawa (CA); Olivier Le Moigne, Ottawa (CA); Jean-Marc Robert, Ottawa (CA)

(73) Assignee: Alcatel Lucent, Paris (FR)

( * ) Notice: Subject to any disclaimer, the term of this patent is extended or adjusted under 35 U.S.C. 154(b) by 918 days.

(21) Appl. No.: 10/663,791

(22) Filed: Sep. 17, 2003

(65) Prior Publication Data

US 2005/0058129 A1 Mar. 17, 2005

(51) Int. Cl.
*H04L 12/56* (2006.01)
*H04L 12/28* (2006.01)
(52) U.S. Cl. ........................... 370/392; 370/401
(58) Field of Classification Search ................ 370/252, 370/254, 255, 389, 392, 401
See application file for complete search history.

(56) References Cited

U.S. PATENT DOCUMENTS 7,200,673 B1 * 4/2007 Augart ...................... 709/238

2003/0172289 A1 9/2003 Soppera

OTHER PUBLICATIONS

Abraham Yaar et al: "Pi: A path identification mechanism to defend against DDoS attacks," Proceedings of the 2003 Symposium on Security and Privacy. (S&P 2003). Berkeley, CA, May 11-14, 2003, Proceedings of the IEEE Symposium on Security and Privacy, Los Alamitos, CA: IEEE Comp. Soc., US May 11, 2003 (pp. 93-107).

* cited by examiner

*Primary Examiner*—Chau Nguyen
*Assistant Examiner*—Hicham B Foud

(57) ABSTRACT

The Time to Live (TTL) field in an IP header is used as a covert channel in a communication system. More particularly the TTL field can be used to selectively mark packets with unique identifiers as they pass through an upstream station on their way to a downstream station. In this way the source of a traffic flow at least within a particular domain can be absolutely identified. This method of performing a traceback operation doesn't utilize additional resources as it relies on functionality which already exists in the system.

11 Claims, 3 Drawing Sheets

```
 0                   1                   2                   3
 0 1 2 3 4 5 6 7 8 9 0 1 2 3 4 5 6 7 8 9 0 1 2 3 4 5 6 7 8 9 0 1
+-+-+-+-+-+-+-+-+-+-+-+-+-+-+-+-+-+-+-+-+-+-+-+-+-+-+-+-+-+-+-+-+
|Version|  IHL  |Type of Service|          Total Length         |
+-+-+-+-+-+-+-+-+-+-+-+-+-+-+-+-+-+-+-+-+-+-+-+-+-+-+-+-+-+-+-+-+
|         Identification        |Flags|      Fragment Offset    |
+-+-+-+-+-+-+-+-+-+-+-+-+-+-+-+-+-+-+-+-+-+-+-+-+-+-+-+-+-+-+-+-+
|  Time to Live |    Protocol   |         Header Checksum       |
+-+-+-+-+-+-+-+-+-+-+-+-+-+-+-+-+-+-+-+-+-+-+-+-+-+-+-+-+-+-+-+-+
|                         Source Address                        |
+-+-+-+-+-+-+-+-+-+-+-+-+-+-+-+-+-+-+-+-+-+-+-+-+-+-+-+-+-+-+-+-+
|                      Destination Address                      |
+-+-+-+-+-+-+-+-+-+-+-+-+-+-+-+-+-+-+-+-+-+-+-+-+-+-+-+-+-+-+-+-+
|                    Options                    |    Padding    |
+-+-+-+-+-+-+-+-+-+-+-+-+-+-+-+-+-+-+-+-+-+-+-+-+-+-+-+-+-+-+-+-+
```

Figure 1

IP TIME TO LIVE (TTL) FIELD USED AS A COVERT CHANNEL

FIELD OF THE INVENTION

This invention relates to wide area communications systems and more particularly to apparatus and methods using the Time to Live (TTL) field in an Internet datagram header (or IP header) as a covert channel for applications such as flow trace back.

BACKGROUND

Global communications networks such as the Internet have evolved from an early research-based system with limited access to a truly world wide network with millions of users. The original Internet Protocol (IP) was designed on the basis that system users would connect to the network for strictly legitimate purposes. As a consequence, no particular consideration was given to security issues. In recent years, however, the incidence of malicious attacks on the Internet has grown to an alarming proportion. These attacks, which take on a variety of forms, often lead to a complete disruption of service for a targeted victim.

A DoS attack involves blocking somebody's ability to use a given service on the network. DoS attacks are common across the Internet with many being launched daily at various targets. One such attack is based on the concept of flooding a victim with so much traffic that the victim's server cannot cope, or with very effective malicious packets at lower rates.

Since identification of the source relies on the information provided by the sender itself, the Internet Protocol (IP) makes it extremely difficult to precisely identify the real source of any given datagram, and thus any given flow, if the source wishes to remain unknown. This peculiarity is often exploited, during a malicious Denial of Service (DoS) attack, to hide the source of the attack. Thus, if an attacker uses a spoofed source address—i.e. replaces its legitimate address with a different/illegitimate one—it is very difficult to trace the real source of the attack. It is expected that if attackers were open to identification the incidence of DoS attacks would decrease significantly. Mechanisms for tracing back anonymous network flows in autonomous systems are described in co-pending application filed Aug. 7, 2003 under Ser. No. 10/635,602 and entitled "Mechanism for Tracing Back Anonymous Network Flows" (Jones et al.). The contents of the earlier application are incorporated herein by reference.

The present application contemplates the use of covert channels to implement trace back functionality.

Covert channels are defined as "channels that use entities not normally viewed as data objects to transfer information from one subject to another." Although a covert channel is generally regarded as a breach in the security of a system, it is possible to isolate certain applications in which covert channels can be used to the advantage of a network system. In the general arena of computer networks, or more specifically in the case of the "Internet", a covert channel could provide, amongst other features, an efficient way to "mark" packets for a trace back solution.

Trace back is defined as the process by which a flow of packets is bound to its source, regardless of possible misleading efforts by the source to hide its location. In fact, due to their stateless nature packet switched networks, including the "Internet", do not easily accommodate tracing, or recording the path of a flow across the network. The source field contained in each packet is meant to provide this information. In reality spoofing the information contained in this field is generally a trivial operation and a very common practice among malicious users.

Covert channels in telecommunications, and specifically in computer networks, are a well known topic while automated trace back techniques in packet switched networks are a more recent topic.

Some prior art trace back solutions make an implicit use of covert channels within the IP header to mark packets. These techniques include Probabilistic Packet Marking and Algebraic Approach together with all their variations. An article by D. X. Song, and A. Perrig entitled "Advanced and Authenticated Marking Schemes for IP Traceback", IEEE Infocom 2001 provides greater details in connection with these schemes.

In general, regardless of the trace back mechanism adopted, the following marking schemes have been proposed using the IP header as the marking medium: i) a dedicated IP Option appended "in flight" (not a real covert channel) or ii) a semantic re-assignment of the 16-bit IP Identification field.

In the case of IP Options the main problem is that every marked packet will have its length increased during its journey. Packets already close in size to the Maximum Transfer Unit (MTU) of any given link on their path are likely to be fragmented if one, or more, IP Options field is added to them. On top of this, appending an IP Options field to an IP packet is a very expensive operation for a modern router; it usually cannot be carried out while the IP packet is in the "fast path" of the processing router, but requires the packet to be set aside and manipulated with special resources available only in the control plane ("slow path"). The packet will also generally be placed in the slow path of every subsequent router from this point on, since it carries an IP Option.

In the case of the IP Identification field the major problem is the semantic infringement leading to backward compatibility issues. The IP Identification field is used as a means to differentiate IP fragments that belong to different IP packets. If a packet is fragmented its identification field is replicated into each fragment so that the receiver can easily reassemble all the fragments into the original packet. Re-using the IP Identification field leads to two potentially dangerous scenarios as will be described next, together with the total loss of communication between any two legitimate hosts relying on this field.

Solutions based on assigning a new meaning to the 16-bit IP Identification field come in several flavors and often involve the use of hashing functions to overload the 16 available bits with more information at the cost of some conflicts.

The first one occurs when a packet is fragmented before it reaches any marking router. In this case, there is a chance that at every subsequent hop any of its fragments may be re-marked with trace back information. Thus, the receiver will fail to reassemble the original packet. The liabilities in this case are waste of bandwidth and network resources—spent to transmit all fragments of an IP packet that will never be reassembled together—and waste of buffering resources in the receiver, that will maintain all the fragments in vain, and potential connectivity loss.

The second scenario occurs when any IP packet is fragmented after it has been marked. In this case the trace back marking already present in the packet will be copied on all the fragments as a valid identification tag. A router is very likely to always mark packets with the same marking value. Since a receiver will buffer fragments of an IP packet until the whole IP packet is reconstructed, or for a certain interval, if any of the fragments does not reach the receiver it may be replaced by a fragment from a successive IP packet that was fragmented later on by the same marking router.

There is, therefore, a need to improve trace back efficiency in communication systems such as the Internet.

SUMMARY OF THE INVENTION

The basic concept of the present invention is to use the TTL field to mark IP packets at one or more upstream stations (routers) in a manner such that a downstream station (router or generic host) can detect that the packets were so marked and that the downstream station, or other entity, can identify which of the upstream stations, if any, did the packets traverse.

The upstream stations could be edge routers or any other routing device in a service provider span of control. Downstream stations include edge routers, last mile routers, receiving devices and any other device that is in the path to the receiving device. There is also the need for a directing entity coordinating the trace back process, and this could be integrated in the network management system.

Therefore in accordance with a first aspect of the present invention there is provided a method of determining, in a communications network, an upstream station traversed by a packet flow, arriving at a downstream station comprising the steps of: a) marking the TTL field of the packet flow arriving at the upstream station in a manner that uniquely identifies the upstream station among all the other concurrently marking upstream stations; b) receiving and identifying at the downstream station the marked packet flow; and c) determining depending, upon the TTL field of the marked packet flow received, that said packet flow traversed the upstream station In accordance with a second aspect of the present invention there is provided a system for determining, in a communications network, an upstream station traversed by a packet arriving at a downstream station, comprising: means for marking the TTL field of the packet flow arriving at the upstream station in a manner that uniquely identifies the upstream station among all the other concurrently marking upstream stations; means for receiving and identifying at the downstream station a marked packet flow; and means for determining depending, upon the TTL field of the marked packet flow received, that said packet flow traversed the upstream station.

BRIEF DESCRIPTION OF THE DRAWINGS

The invention will now be described in greater detail with reference to the attached drawings where:

FIG. 1 is an example of an Internet datagram header;

DETAILED DESCRIPTION OF THE INVENTION

FIG. 1 illustrates an Internet datagram header exemplifying the various fields and length of each in bits. The Time To Live (TTL) field which is 8 bits long indicates the maximum time that a datagram is allowed to remain in the Internet system. If this field contains the value 1 then the datagram must be destroyed. Typically, this field is modified during Internet header processing. The time is measured in units of seconds, but since every module that processes the datagram must decrease the TTL by at least one, even if it processes the datagram in less than a second, the TTL must be thought of only as an upper bound on the time a datagram may exist. The intention is to cause undeliverable datagrams to be discarded and to bound the maximum datagram lifetime, thus preventing loops. In the concept of the present invention, the TTL field is used as a means to pass information from an upstream station i.e. marking router to a downstream station on the path to the receiver. Modern Internet hosts will set the TTL value for all their IP packets to two common values 64 or 128.

Figure 2:
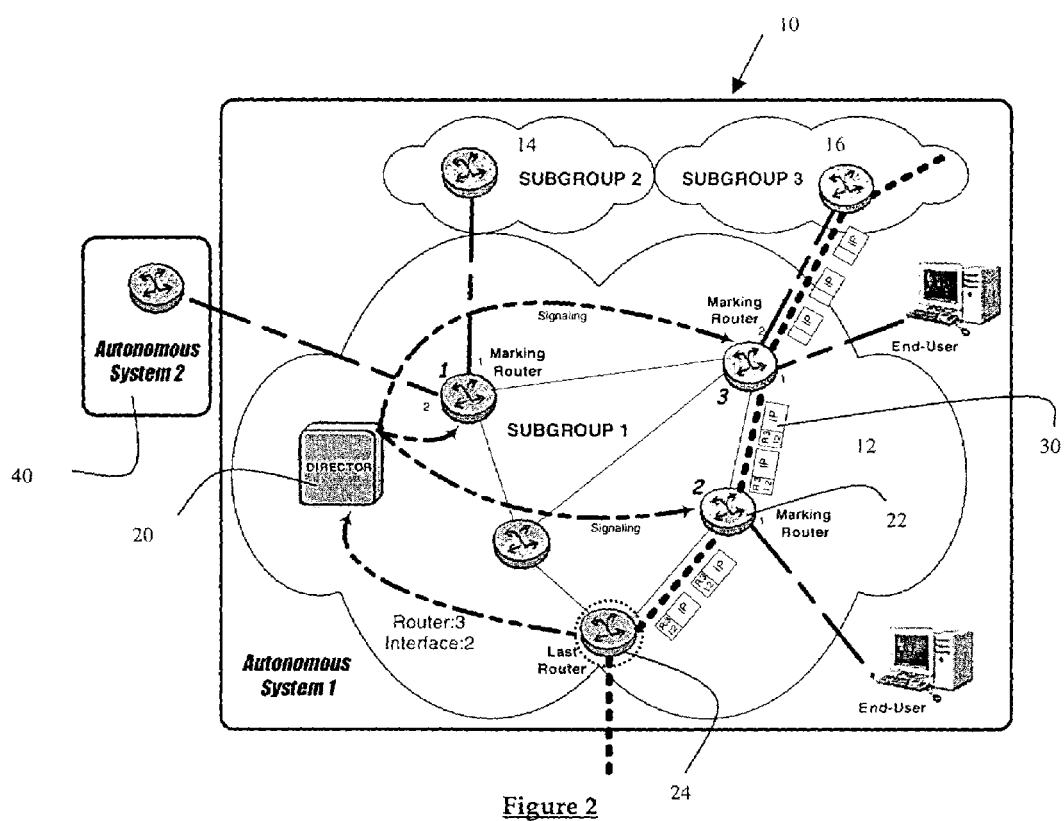
FIG. 2 shows a high level view of an autonomous system including subgroups (as defined in the aforementioned related application) and system components as contemplated by the present invention.

FIG. 2 generally illustrates the environment in which the marking system can be implemented. A flow from an interface into an autonomous system 10, from another autonomous system 40 or from a subgroup (14, 16) within the autonomous system enters a router through an external interface. Routers, through which the flow traverses from the external interface to an end user or last router 24 in the system, are marking or otherwise identifying the flow that they forward. The aforementioned co-pending U.S. application provides greater details in connection with this marking procedure.

The basic idea behind the present invention is that the TTL field of some packets of a single flow can be used to pinpoint which router among a set of candidates was actually traversed by the flow. This is possible if every marking router changes the TTL field according to a defined pattern—unique for every router—for all the packets crossing its interfaces. In this case, recording the TTL value of the packets before the marking is enabled and observing the difference while the marking is activated will allow the Director 20, as defined in the aforementioned related patent application and as shown in FIG. 2 to determine which upstream router is currently marking the flow.

Figure 3:
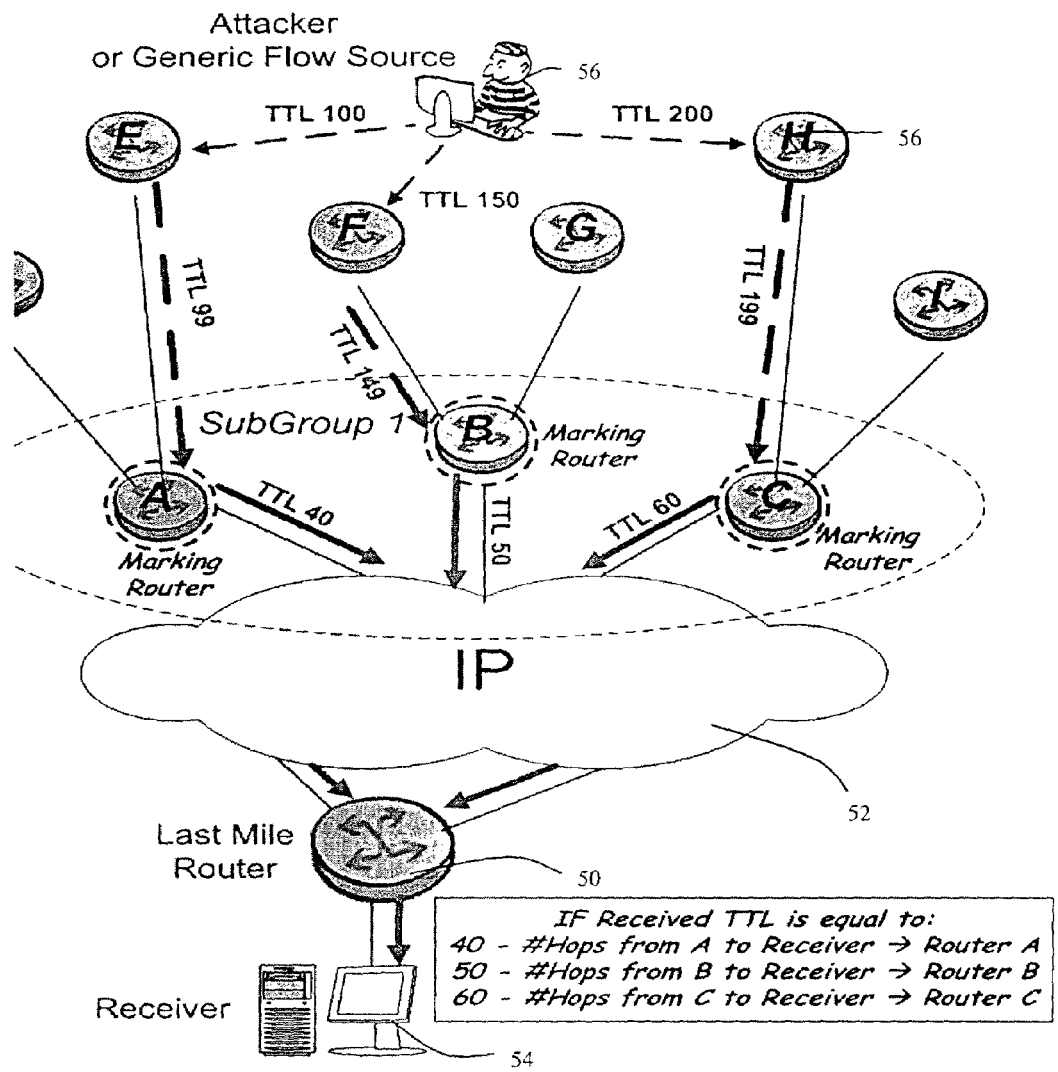
FIG. 3 illustrates a preferred implementation of the present invention.

FIG. 3 illustrates the environment in which the present invention finds application. As shown, a last mile router 50 at the edge of an IP network 52 is accessed by an end user utilizing receiver 54. A network of routers 56, and identified herein as routers A to I, are connected in a mesh network. As shown in FIG. 3, an attacker or a source of generic flow 56 could potentially be a source of an attack on receiver 54.

Using the TTL field in the IP datagram header each packet traversing particular stations or routers in the path from the attacker 56 to the receiver 54 have their TTL field modified. This may be by subtracting an arbitrary amount from the number or by using some other marking technique which will be described later. As shown within subgroup 1 marking routers are used to more specifically identify the source of the flow to the last mile router or consequently the receiver. Using the legend in the bottom of FIG. 3 it is possible to determine which is the current source for the marked packet.

The main advantage of this basic embodiment lies in the fact that the TTL field is actually utilized as meant by the IP specifications: every router subtracts one or more from the TTL field. Obviously, if the subtracted value is too big some packets may expire and never reach their destination. Thus, there is an implicit limit in the number of routers that can safely mark concurrently.

Endlessly more complicated solutions can be created to increase the number of concurrent marking routers; some significant ones are described next, but this list is by no means complete and is presented only for clarification purposes.

The marking routes could violate the TTL principle and sum, subtract, or replace instead of simply subtract marking values. A marking value can be assigned at the interface level rather than at the router level. The marking stations (routers or interfaces) could be assigned more than one marking value, and cycle through these. A station may mark M packets with value A, then N packets with value B etc . . . As long as the marking protocol and the marking values are known, the Director will be able to identify the marking station after having observed the necessary number of intervals and their respective marking changes. Stations may also use different marking values concurrently and assign a different proportion to every value. In this case, the marking values used and the ratio between them will determine the identity of the station that was marking.

The marking protocol and its values can be set statically by some entity like the network administrator or via some automated network management software, or communicated dynamically together with the marking request by the Director (or by any other trusted entity in the network).

If the flow being traced were to be of malicious nature, the attacker generating this flow may decide to randomize the TTL field of all, or a portion, of the malicious packets. In this scenario, simply subtracting a value may not be sufficient to determine the marking station upstream. The use of statistical tools based on probability distributions' features can be employed to recognize and differentiate marking values. Any distribution chosen by the attacker can be described (at least partially) by statistical features such as the average, the minimum and maximum value and so on. For example if the attacker is randomizing the IP packets' TTL between 50 and 145, subtracting 10 or 20 will affect the current maximum and minimum for the distribution observed by the receiver. If the receiver has observed an adequate number of TTL values before any marking was applied and it is located 8 hops away from the source of the packets and 20 is the current marking value, the receiver will not observe any IP packets with TTL higher than 145−8−20=117 and soon conclude that 20 is the current marking value. Conversely, if the current marking value were to be 10, the receiver would eventually see some packets between 117 and 127 (127=145−8−10) and therefore deduce that the current marking value is actually 10. Similar schemes can be designed and applied to the average of the TTL values distribution and/or to other statistical features.

Another possibility in the presence of randomized TTL values is to ask all marking routers to set these TTL values to unique ones assigned to each marking router, or to each desired interface on a router.

Other schema can be designed to deal with the case of Distributed Denial of Service (DDoS). In this situation, multiple sources collude to generate a single flow destined to the same victim with spoofed IP source values. Thus, a group of marking routers may be faced with the task of effectively marking more than one stream of packets converging together. A simple solution to this problem may consist of asking all routers to mark the same value and assign a secondary marking value to only one router at the time. More efficient and sophisticated alternatives are possible.

The major advantage of the presented solution is that it could be deployed easily in today's "Internet" infrastructure leveraging current technology. The presented solution is based on setting the TTL to a certain value on command. Changing the TTL field is an operation that all network devices (routers) always perform on every packet they forward. Little intelligence is needed (if is not already available) in the resources already assigned to successfully set the TTL to an arbitrary value. The only missing part, on already deployed routers, maybe the communication between the Director (the trace back controlling entity) and the marking routers. This communication needs to be implemented in a secure and trusted fashion both within the same Autonomous System as well as across several ones, if the trace back is extended outside the boundaries of a single Autonomous System. It is important to underline that this requirement is often common to all currently known trace back solutions, and it is not tied to any specific marking solution.

The solution provided by the invention is designed to produce minimal, or no, impact, both on the regular traffic (internet background) as well as on the flow being traced to its origin(s). This is mainly due to the fact that the presented solution does not alter the meaning of the TTL field, at least in its basic applications, nor does it re-assign a new semantic subdivision to any of its bits. The same cannot be said about using the IP Identification field or the IP Options as illustrated earlier.

If during a marking interval the TTL is ever increased, or set to an arbitrary value, looping packets that cross one TTL marking station may potentially loop for a longer period. This marking solution is meant to be turned on briefly on a group of routers and then moved on to the next. This may extend the life of a looping packet by at maximum the length of the marking interval (expected to be in the seconds or much less), but it will never prevent a packet destined to expire from doing so eventually.

On the other hand, if marking values are not carefully chosen some packets may be forced to expire before reaching their destination. If marking values are wisely chosen and general traffic patterns and TTL values are observed and understood before any trace back occurs, only malicious packets with randomized TTL should expire due to TTL markings.

Finally, packets employed by any Traceroute utility (a network debugging tool) may be temporarily affected by the presented solution if the route being traced crosses a group of active marking routers. One obvious answer to this problem would be to let ICMP Traceroute messages go through without being marked if the flow currently being traced is not made of ICMP packets itself.

Although the foregoing discussion has concentrated on using the TTL field for trace back mechanisms, it will be apparent to one skilled in the art that the TTL can also be used as a covert channel in a more general sense and not only in the scope of a generic trace back solution.

While particular embodiments of the invention have been described and illustrated it will be apparent to one skilled in the art that numerous changes can be made to the method without departing from the basic concept. For example, upstream stations within a service provider span of control can be: edge routers, generic routing devices, generic network appliances or specific ones like a proxy, a firewall, a NAT box or a VPN device, or as simple as a single network interface. Downstream stations can include edge-routers, last mile routers, receiving devices and any other devices that are in the path to the receiving devices. The directing entity, coordinating the trace back process, could be integrated in the network management system. Additionally there are many alternative ways to mark packets using the TTL field to identify the manner of marking and to select the upstream stations that will do the marking. Some of these alternatives include marking at each selected station using static values, single or plural, in a per station or per station interface mode; dynamic values, single or plural, which are assigned by a trace back management entity by a per station or a per station interface mode. In terms of the ways to identify TTL marking in its various forms, this can be done by looking for constant differences between TTL values of packets and flow with marking turned on and off; for proportional marking, looking for matching signatures of proportions of packets with markings, after markings have been identified using the above-noted step; for flows with randomized TTL values (i.e. attacker randomization suspected) looking for constant shifts in parameters for example maximum, minimum or mean of the statistical distribution of TTL value with marking turned on and off and finally for marking with arbitrary values, looking for these known values to be recognized at the receiving device. In terms of the ways of selecting upstream stations to perform marking, these can be specified by the trace back controlling entity, for example an NMS, by a group of network edge stations marking concurrently, by other groups of stations marking currently, by individual stations performing marking and by groups of stations marking concurrently with a common primary mark and selected stations, of a secondary group, using secondary unique marks; the group of stations using the secondary mark rotating amongst all the stations. Further, it is contemplated that each upstream marking station may be assigned k values $V_i \{V_1, V_2, \ldots V_k\}$ and k associated ratios $R_i \{R_1, R_2, \ldots R_k\}$, where the sum of all k ratios $R_i$ is 100%; the marking station marks $R_i$ percent of the packet flow with a $V_i$ value; thus uniquely identifying its marking. The marking station may use n different marking schema independently for n consecutive time windows thus uniquely identifying its marking. It is to be understood, however, that such changes and modification will fall within the full scope of the invention as defined by the appended claims.

We claim:

1. A method of determining, in a communications network, an upstream station, among several other candidates, traversed by a packet having a time-to-live (TTL) field arriving at a downstream station, comprising the steps of:
   a) marking the TTL field of the packet flow arriving at the upstream station, in a manner that uniquely identifies the upstream station among all the other concurrently marking upstream stations;
   b) receiving and identifying at the downstream station a marked packet flow; and
   c) determining, depending upon the TTL field of the marked packet flow received, that said packet flow traversed the upstream station;
wherein the TTL field of the marked packet is identified by looking for constant shifts in statistical parameters and in the distributed TTL value with marking turned on and turned off.

2. The method as defined in claim 1 wherein step c) involves comparing the value of the TTL field of packets in a flow to which said packets belong with and without marking being performed, thereby enabling the manner of marking, which identifies the upstream station, to be determined.

3. A method of determining, in a communications network, an upstream station, among several other candidates, traversed by a packet having a time-to-live (TTL) field arriving at a downstream station, comprising the steps of:
   a) marking the TTL field of the packet flow arriving at the upstream station in a manner that uniquely identifies the upstream station among all the other concurrently marking upstream stations; and
   b) receiving and identifying at the downstream station a marked packet flow; and
   c) determining, depending upon the TTL field of the marked packet flow received, that said packet flow traversed the upstream station; and comparing the value of the TTL field of packets in a flow to which said packets belong with and without marking being performed, thereby enabling the manner of marking, which identifies the upstream station, to be determined;
wherein each upstream marking station is assigned a plurality of values and associated ratios, where the sum of all said associated ratios is 100%; and the marking station marks a percent of the packet flow given by one of said associated ratios with a corresponding one of said values, thus uniquely identifying its marking.

4. The method as defined in claim 3 wherein for flows with randomized TTL values the marked packet is identified by looking for constant shifts in parameters of statistical distribution of TTL values with marking turned on and turned off.

5. The method as defined in claim 3 wherein the marking station uses a plurality of different marking schema and wherein marking of packets is performed using in succession a different one of said schema over a plurality of consecutive time windows.

6. A system for determining, in a communications network, an upstream station, among several other candidates, traversed by a packet having a time-to-live (TTL) field arriving at a downstream station, comprising:
   a) means for marking the TTL field of the packet flow arriving at the upstream station, in a manner that uniquely identifies the upstream station among all the other concurrently marking upstream stations; and
   b) means for receiving and identifying at the downstream station a marked packet flow; and
   c) means for determining depending upon the TTL field of the marked packet flow received that said packet flow traversed the upstream station;
wherein the upstream station to mark packets is selected by a group of network edge stations marking concurrently with a common primary mark and one selected station of the group using a secondary unique mark, the selection of the station using the secondary mark rotating among stations of the group.

7. The system as defined in claim 6 wherein the value of the marked packet is assigned dynamically by an external entity.

8. The system as defined in claim 6 wherein the upstream station to mark packets is selected by an external entity.

9. The system as defined in claim 6 wherein the upstream station to mark packets is selected by a group of network edge stations marking concurrently.

10. The system as defined in claim 6 wherein the downstream station is one of an edge router; a last mile router; receiving device and a network management system.

11. The system as defined in claim 6 wherein the upstream stations, also referred to as marking station, is one of a generic router; a core router; an edge router; a single network interface; a last mile router; and a network appliance.

* * * * *